(12) United States Patent
Gordon et al.

(10) Patent No.: US 8,639,750 B2
(45) Date of Patent: Jan. 28, 2014

(54) ORCHESTRATION OF WEB NOTIFICATIONS

(75) Inventors: Ariel Gordon, Kirkland, WA (US); Andrew McManama Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 80 days.

(21) Appl. No.: 13/267,439

(22) Filed: Oct. 6, 2011

(65) Prior Publication Data

US 2013/0091195 A1    Apr. 11, 2013

(51) Int. Cl.
*G06F 15/16* (2006.01)

(52) U.S. Cl.
USPC ........... 709/203; 709/227; 709/201; 709/202; 719/313; 719/314; 719/315; 719/316; 719/317

(58) Field of Classification Search
USPC ........................ 709/201–203; 719/313–317
See application file for complete search history.

(56) References Cited

U.S. PATENT DOCUMENTS

| 2009/0328063 | A1* | 12/2009 | Corvera et al. ............... 719/315 |
| 2010/0077058 | A1* | 3/2010 | Messer .......................... 709/219 |
| 2010/0083383 | A1* | 4/2010 | Adler et al. ..................... 726/26 |
| 2010/0299738 | A1 | 11/2010 | Wahl |
| 2011/0067095 | A1 | 3/2011 | Leicher et al. |
| 2011/0116637 | A1* | 5/2011 | Schiefelbein ................. 380/286 |
| 2011/0161413 | A1* | 6/2011 | Cierniak et al. ............... 709/203 |
| 2011/0214133 | A1* | 9/2011 | Lum et al. ..................... 719/318 |
| 2011/0252141 | A1* | 10/2011 | Boberg et al. ................. 709/226 |
| 2011/0264861 | A1* | 10/2011 | Fee et al. ....................... 711/122 |

OTHER PUBLICATIONS

Hall, Core Web Programming, 2001-2003.*
Federal Identity, Credentialing, and Access Management, OpenID 2.0 Profile, ICAM Identity, Credential, & Access Management, Version 1.0.1, Release Candidate, Published Nov. 18, 2009.
Jones, Michael B., Microsoft Corporation, A Guide to Using the Identity Selector Interoperability Profile V1.5 within Web Applications and Browsers, Jul. 2008.

* cited by examiner

*Primary Examiner* — Backhean Tiv
*Assistant Examiner* — Weiwei Stiltner
(74) *Attorney, Agent, or Firm* — Workman Nydegger

(57) ABSTRACT

The present invention extends to methods, systems, and computer program products for orchestrating notifications between identity platforms and relying parties. Embodiments enable identity platforms to ensure that users consistently receive notifications, even when the identity platforms lack knowledge of which relying parties are notification capable and which relying parties are incapable of notification. Embodiments include an identity platform generating a frameset having a first content frame for displaying a notification and a second content frame for displaying a relying party web page. When the relying party is notification capable, the relying party web page includes functionality for removing the frameset established by the frameset and displaying the notification within the context of the relying party web page. When a client renders the frameset, the client retrieves and renders the relying party web page, removing the frameset and displaying the notification as directed by the relying party.

20 Claims, 9 Drawing Sheets

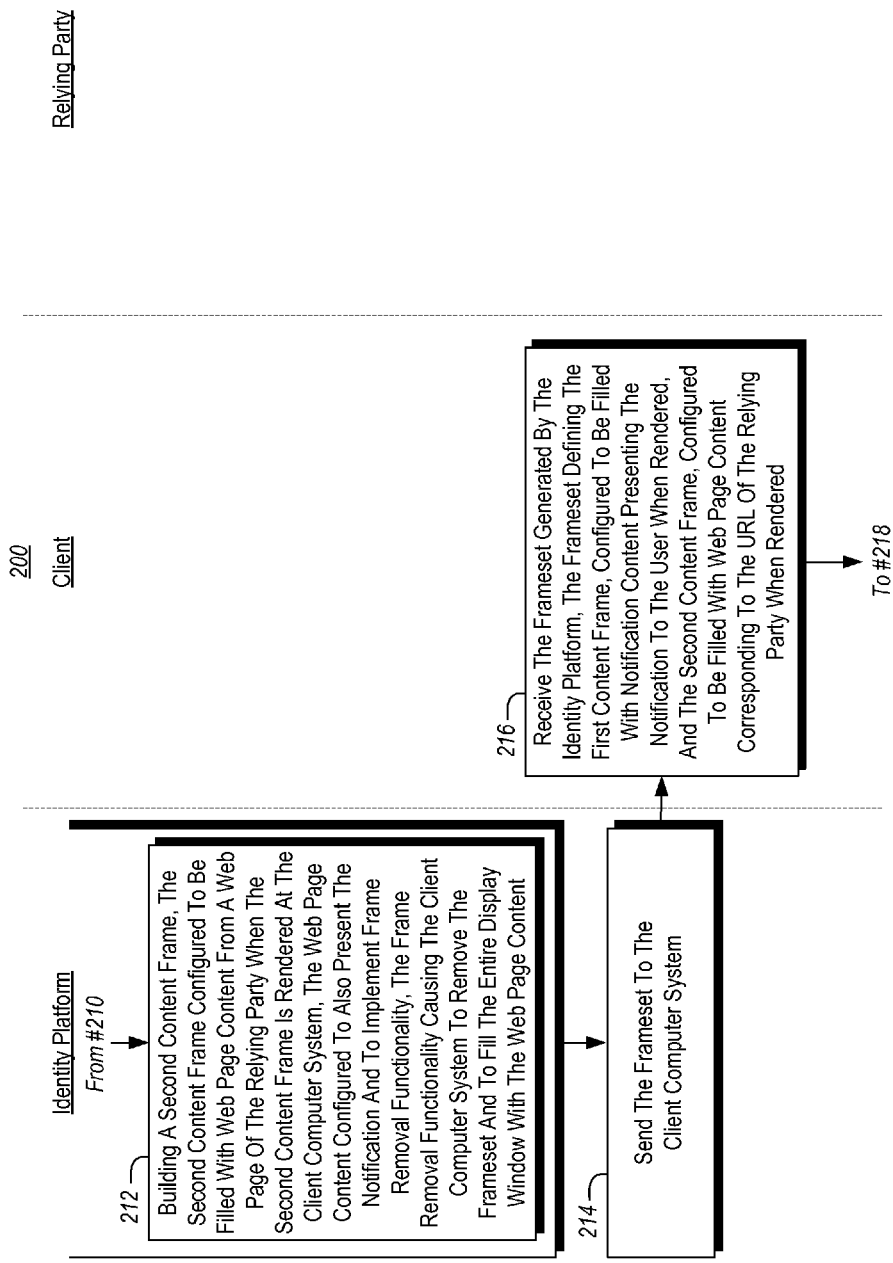

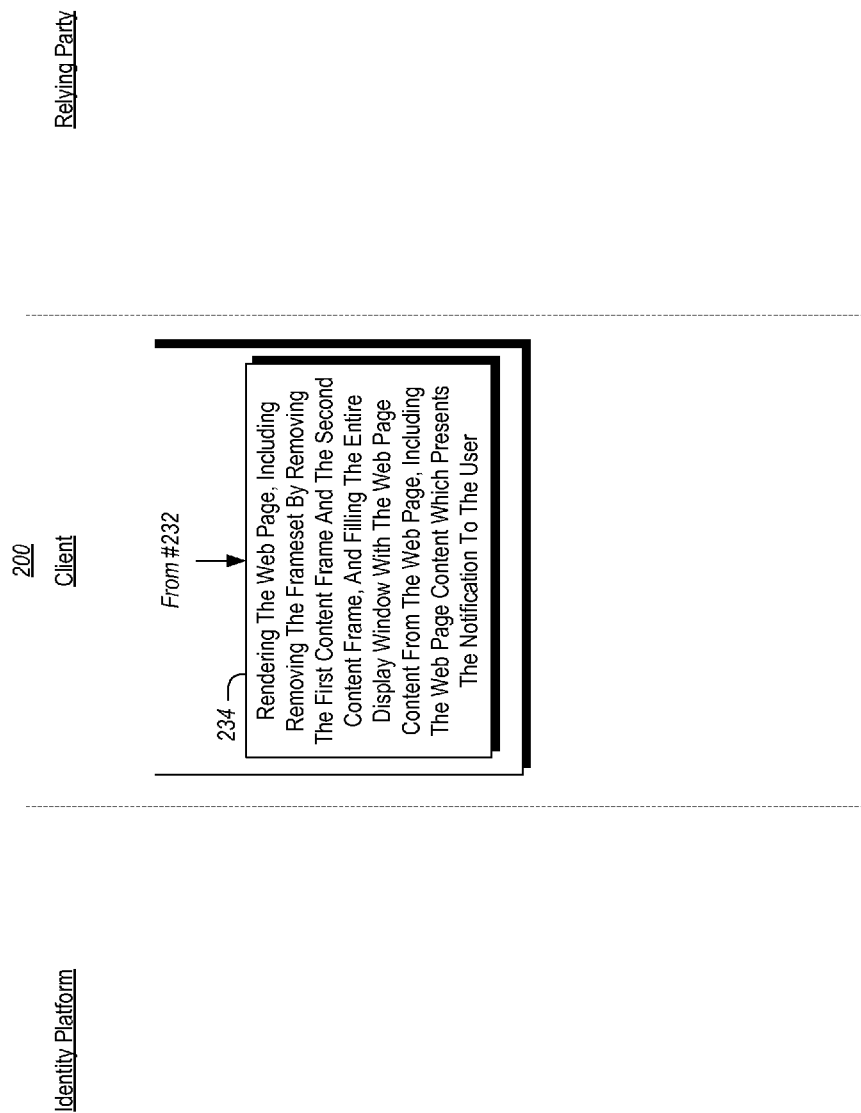

ORCHESTRATION OF WEB NOTIFICATIONS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Frequently, computing environments include one or more identity management systems or platforms that are responsible for managing user authentication and access to resources within the computing environment. For example, some computing environments implement federated identity systems, which establish trust relationships between differing parties (e.g., organizations providing services) using a set of agreements, standards, and technologies. Generally, federated identity systems include an identity platform or provider that creates, maintains, and/or manages user identity information (e.g., user credentials) for use within the federated identity system. The credentials can be used, for example, for authentication of a user to one or more relying parties that provide services to the user. Thus, users within the federated identity system can use a single credential, established with the identity platform, to access services from a variety of parties within the federated identity system.

As part of managing identity information and a federation, it is often the case that notifications need to be presented to a user to provide the user information regarding the user's credentials or the federation, and/or to request user input. The nature of such notifications can vary widely, but frequently include password expiration warnings, account intrusion warnings, requests for updated contact information, service outage notifications, new feature notifications, etc. One option for presenting these notifications to a user is to present an interim page to the user after the user authenticates and before presenting the user with the relying party's web page. The interim page can display the notification(s) and may contain options enabling the user to act on and/or ignore the notification(s). This form of notification can be very distracting to users, as it causes an interruption to the user's authentication experience. Another option is to present notifications to the user within the context of the web page of the relying party to which the user has authenticated.

In some federated identity systems, notifications can originate from the identity platform and/or relying parties. For example, when a user's password is about to expire it may be equally valid for the identity platform to initiate display of a password expiration notification to the user, or for one or more relying parties to initiate display of the password expiration notification. In this context, however, providing the expiration notification can be a complicated process, as the notification platform may be unaware of whether or not a relying party is also initiating display of an expiration notification. Likewise, relying parties may be unaware of whether or not the notification platform is also initiating display of the expiration notification. Thus, the user may receive duplicate notifications if both the relying party and the identity platform initiate a notification, or may receive no notification at all if the parties assume a different party presented the notification.

As such, identity platforms and relying parties may have to closely time and synchronize any changes to their respective systems to ensure that users receive notifications when they are available, and to ensure that users do not receive duplicate notifications. For example, suppose a relying party, which previously relied on an identity platform to display notifications to users, were to suddenly implement and enable its own notification functionality. Once the relying party enabled its notification functionality, users authenticating to that party would receive duplicate notifications—one from the identity platform and one from the relying party. To avoid this, the relying party would need to closely time the release of its notification functionality with the identity platform. As soon as the relying party enables its notification functionality the identity platform needs to stop presenting notifications to users authenticating to that relying party. If the identity platform disables its notifications too soon, users potentially miss notifications. Conversely, if the identity platform disables its notification too late, users potentially receive duplicate notifications. In a large ecosystem with a large number of relying parties, the burden of managing such synchronization is difficult, if not completely unmanageable.

BRIEF SUMMARY

The present invention extends to methods, systems, and computer program products for orchestrating notifications between identity platforms and relying parties. In particular, the present invention eliminates the need for identity platforms and relying parties to closely synchronize the release of notification functionality between one another, while maintaining consistency in notification. As such, identity platforms can present notifications to users regardless of whether or not a relying party independently generates notifications. Accordingly, relying parties can implement notification functionality without synchronization with identity platforms.

In some embodiments, a relying party receives a request for web page content in connection with a user at a client gaining access to the relying party through an identity platform. The relying party determines that a notification exists for the user, and configures a web page for the client. The web page includes frame removal functionality for causing the client to remove any frameset established by the identity platform, and to instead fill an entire display window at the client with the content of the web page when the web page is rendered at the client. The web page also includes notification content for presenting the notification to the user within the context of the web page when the web page is rendered at the client. The relying party sends the web page to the client.

In additional embodiments, a client receives a frameset generated by an identity platform. The frameset defines a first content frame configured to be filled with notification content which presents a notification to a user when rendered by the client. The frameset also defines a second content frame configured to be filled with web page content corresponding to a URL of a relying party when rendered. The client renders the frameset. Rendering the frameset causes the client to divide a display window into the first content frame and the second content frame, and to retrieve a web page from the relying party based on the URL. The retrieved web page includes frame removal functionality configured to cause the client to remove the frameset and to fill the entire display window with the web page, including web page content which presents the notification to the user. The client renders the web page, removing the frameset and filling the entire display window with the web page content from the web page, including the web page content which presents the notification to the user.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
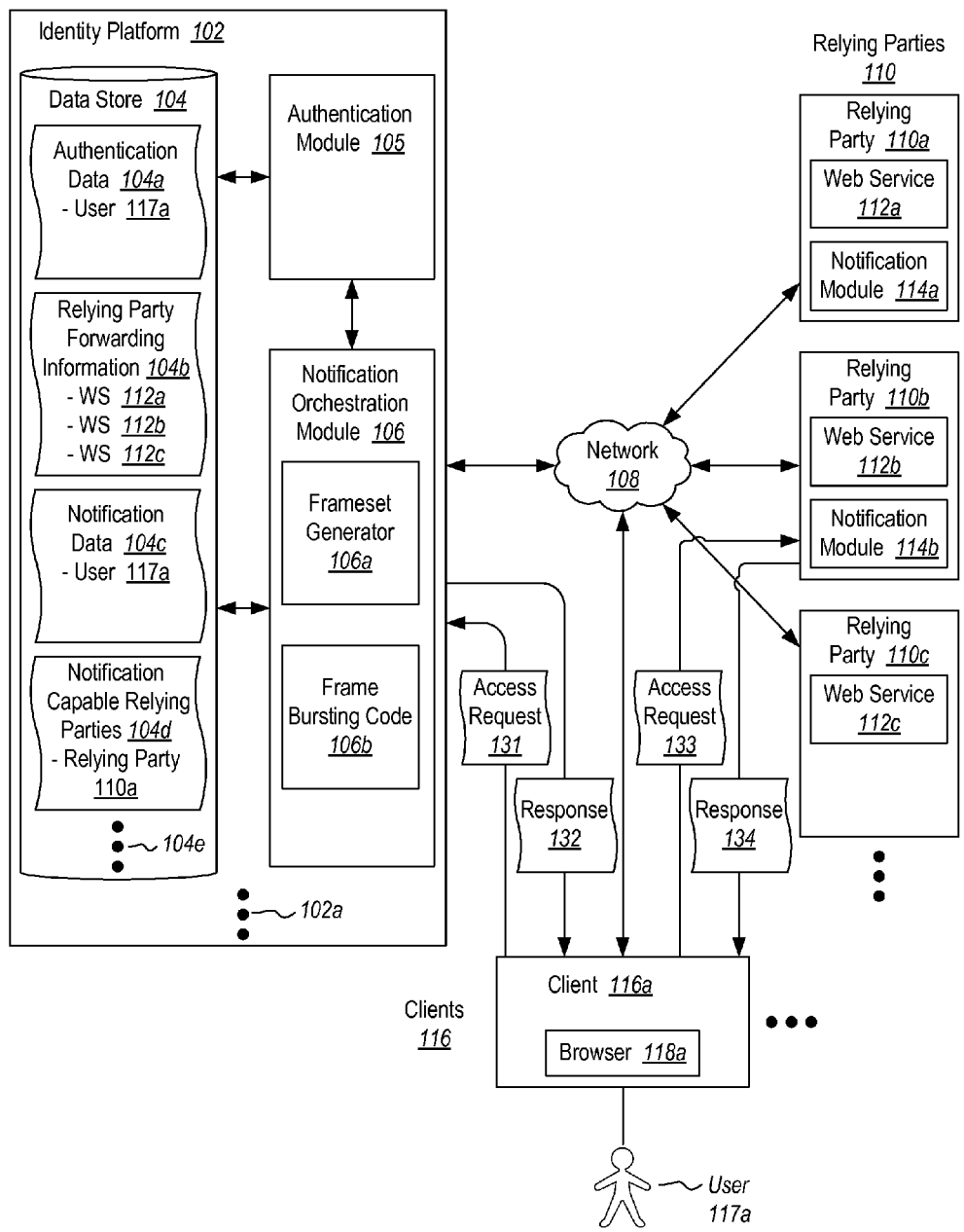
FIG. 1 illustrates an example computer architecture that facilitates orchestrating notifications between identity platforms and relying parties.

The present invention extends to methods, systems, and computer program products for orchestrating notifications between identity platforms and relying parties. In particular, the present invention eliminates the need for identity platforms and relying parties to closely synchronize the release of notification functionality between one another, while maintaining consistency in notification. As such, identity platforms can present notifications to users regardless of whether or not a relying party independently generates notifications. Accordingly, relying parties can implement notification functionality without synchronization with identity platforms.

In some embodiments, a relying party receives a request for web page content in connection with a user at a client gaining access to the relying party through an identity platform. The relying party determines that a notification exists for the user, and configures a web page for the client. The web page includes frame removal functionality for causing the client to remove any frameset established by the identity platform, and to instead fill an entire display window at the client with the content of the web page when the web page is rendered at the client. The web page also includes notification content for presenting the notification to the user within the context of the web page when the web page is rendered at the client. The relying party sends the web page to the client.

In additional embodiments, a client receives a frameset generated by an identity platform. The frameset defines a first content frame configured to be filled with notification content which presents a notification to a user when rendered by the client. The frameset also defines a second content frame configured to be filled with web page content corresponding to a URL of a relying party when rendered. The client renders the frameset. Rendering the frameset causes the client to divide a display window into the first content frame and the second content frame, and to retrieve a web page from the relying party based on the URL. The retrieved web page includes frame removal functionality configured to cause the client to remove the frameset and to fill the entire display window with the web page, including web page content which presents the notification to the user. The client renders the web page, removing the frameset and filling the entire display window with the web page content from the web page, including the web page content which presents the notification to the user.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. Program modules for one entity can be located and/or run in another entities data center or "in the cloud."

When a relying party is not known to be notification capable, an identity platform can generate a notification for a client when forwarding that client to the relying party. As such, when the relying party is not notification capable (i.e., does not generate notifications on its own) the client receives and displays the notification generated by the identity platform along with the relying party's web page. When the relying party is notification capable, however, the relying party configures its web page to remove (or suppress) the identity platform's notification and to potentially display a notification generated by the relying party. As such, the client has a significantly increased likelihood of receiving a notification, either from the identity platform or from a notification capable relying party, and a significantly decreased likelihood of receiving duplicate notifications. This orchestration can be performed without requiring synchronization between the relying party and the identity platform. For efficiency, once a relying party becomes notification capable, that party can notify the identity platform of this fact so that the identity platform does not needlessly generate notifications that will be later suppressed.

FIG. 1 illustrates an example computer architecture 100 that facilitates orchestrating notifications between identity platforms and relying parties. Referring to FIG. 1, computer architecture 100 includes identity platform 102, a plurality of relying parties 110, and one or more clients 116. Each of the depicted computer systems is connected to one another over (or is part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Generally, identity platform 102 is configured to handle client (and/or user) authentication on behalf of relying parties 110. That is, identity platform 102 is configured to receive requests from clients (or users at clients) for gaining access to a relying party, to verify authentication data for the client (and/or a user at the client), and to forward the client to the requested relying party when properly authenticated. As depicted, the identity platform 102 can include authentication module 105, notification orchestration module 106, and data store 104. Identity platform 102 can also include other modules as indicated by the vertical ellipses 102a. The arrows within identity platform 102 indicate that the expressly depicted components are connected to one another. The depicted components can reside within a single computing system, or can be spread across multiple computing systems and/or computing devices.

Authentication module 105 is configured to authenticate a client and/or a user, such as, for example, client 116a and/or user 117a. Authentication can be initiated in response to client request (e.g., access request 131) requesting access to one of the relying parties 110 through identity platform 102. In response to the client request, authentication module 105 can access authentication data 104a to authenticate the client or the user. Authentication module 105 can also be configured to access other data, such as relying party forwarding information 104b (used to forward the client to one of relying parties 110 after a successful authentication) and notification data 104c.

Notification orchestration module 106 is configured to orchestrate notifications between identity platform 102 and relying parties 110. Notification orchestration module 106 reduces the likelihood of clients receiving duplicate notifications. As depicted, notification orchestration module 106 can include frameset generator 106a and frame bursting code 106b. Frameset generator 106a is configured to generate code or markup that divides a web page into multiple content frames. Frame bursting code 106b is configured to remove a previously presented frameset and any accompanying content frames.

Data store 104 is configured to store information used by authentication module 105 and notification orchestration module 106. All or part of the data stored in data store 104 can also be accessible to other parties, such as relying parties 110. For example, data store 104 may be configured to provide relying parties 110 access to notification data 104c. Data store 104 can store any appropriate information relating to authentication of users or clients to relying parties. As depicted, for example, data store 104 can store one or more of authentication data 104*a*, relying party forwarding information 104*b*, notification data 104*c*, notification capable relying parties 104*d*, etc. Vertical ellipses 104*e* indicate that data store 104 can store any additional information, as appropriate.

Authentication data 104*a* can be configured for consumption by authentication module 105 to authenticate users and/or clients. In some embodiments, authentication data 104*a* takes the form of user credentials, security tokens/certificates, client identification information, etc. As depicted in computer architecture 100, authentication data 104*a* includes authentication information for user 117*a* at client 116*a*. Authentication data 104*a* can be used to authenticate user 117*a* to one or more of relying parties 110.

Relying party forwarding information 104*b* can include any information usable for forwarding clients 116 to relying parties 110 after the clients (or users at the clients) have authenticated. In some embodiments, relying party forwarding information 104*b* comprises one or more Uniform Resource Locators (URLs) for each of relying parties 110. As depicted, each relying party (e.g., relying parties 110*a*, 110*b*, and 110*c*) can provide a web service (e.g., web services 112*a*, 112*b*, and 112*c*) such as a web page. As such, at least in the depicted embodiment, relying party forwarding information 104*b* includes a URL to each web service 112*a*, 112*b*, and 112*c*, as indicated by designations WS 112*a*, WS 112*b*, and WS 112*c*.

Notification data 104*c* can include notification-related information for presentation to clients 116 or users when authenticating to one of relying parties 110 through identity platform 102. For example, notification data 104*c* can relate to password expiration warnings, account intrusion warnings, requests for updated contact information, service outage notifications, new feature notifications, etc. In addition or as an alternative to storing notification data 104*c*, identity platform 102 can be configured to derive notification-related information in connection with client or user authentication, without expressly storing the notification-related information in data store 104. For example, based on authentication data 104*a* and a current date, modules of identity platform 102 can determine that a user's password is about to expire and, in response, initiate notification (e.g., a password expiration warning) for that user.

Identifying notification capable relying parties 104*d*, can include identifying any of relying parties 110 that are notification capable. Notification capable relying parties are parties capable of generating notifications or passing on notifications through their own web services or web pages. For example, relying parties 110*a* and 110*b* are notification capable, as they include notification modules 114*a* and 114*b*, respectively. When a relying party is notification capable, the relying party can inform the identity platform 102 of this capability. As depicted, notification capable relying parties 104*d* identifies relying party 110*a* as notification capable.

Figure 2:
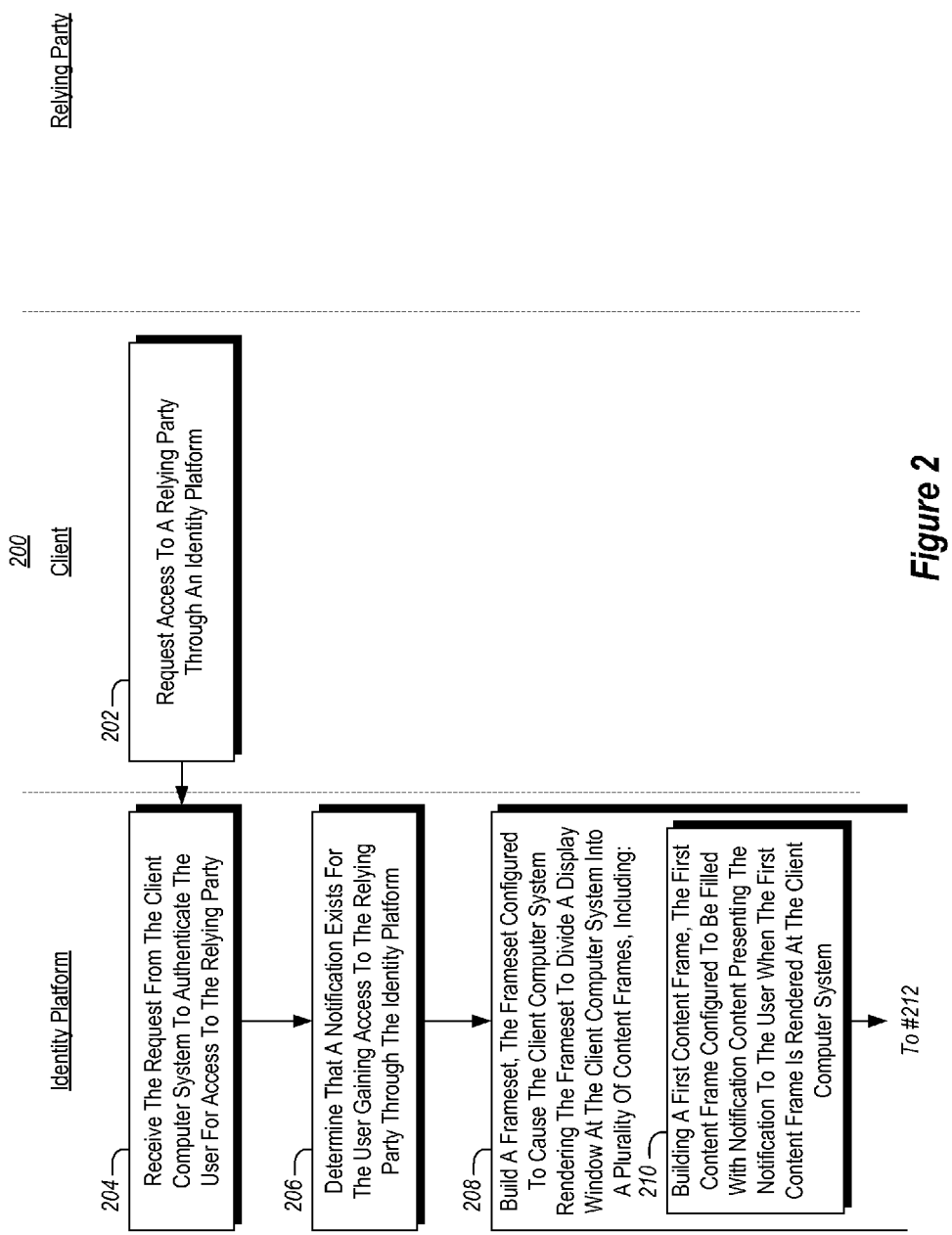
FIG. 2 illustrates a flow chart of an example method for orchestrating notifications.
Figure 2:
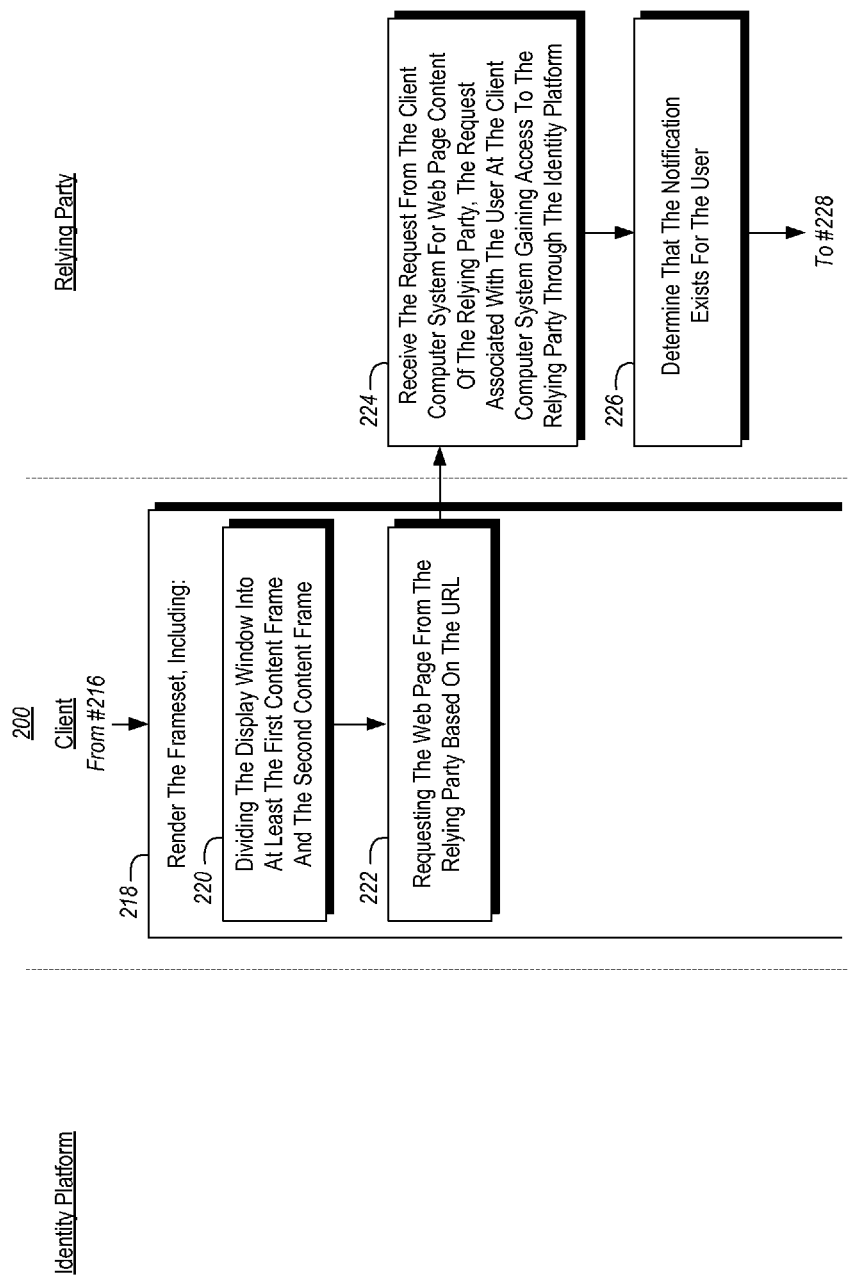
Figure 2:
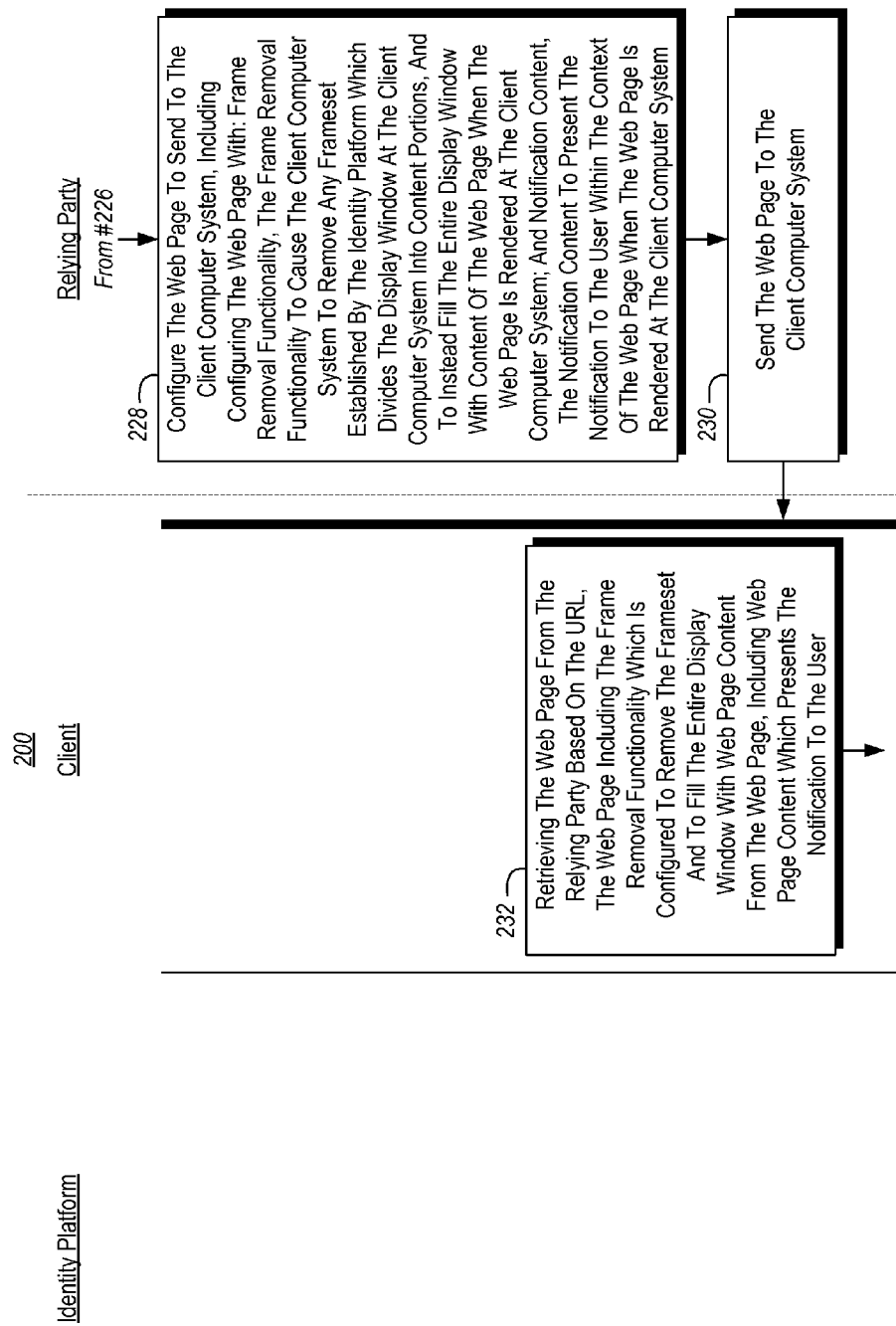

FIG. 2 illustrates a flow chart of a method 200 for orchestrating notifications, including acts performed by an identity platform, a relying party, and a client computer system. These acts will be described with respect to the components and data of computer architecture 100 of FIG. 1.

Method 200 includes an act of requesting access to a relying party through an identity platform (act 202). For example, user 117*a* can cause client 116*a* to send access request 131 to identity platform 102. Access request 131 can comprise a request for identity platform 102 to authenticate user 117*a* and/or client 116*a* for access to one or more of relying parties 110, such as relying party 110*b*. In some embodiments, access request 131 can include authentication credentials. In other embodiments, authentication credentials can be provided in a separate communication or even from a third party.

Method 200 includes an act of receiving the request from the client computer system to authenticate the user for access to the relying party (act 204). For example, identity platform 102 can receive access request 131 from client 116*a*. In response to receiving access request 131, authentication module 105 can authenticate user 117*a* and/or client 116*a*, or perform any other appropriate tasks responsive to access request 131.

Method 200 includes an act of determining that a notification exists for the user gaining access to the relying party through the identity platform (act 206). For example, authentication module 105 and/or notification orchestration module 106 can determine that a notification exists for user 117*a*. In some embodiments, determining the existence of a notification is based on notification data 104*c*. In other embodiments, determining the existence of a notification is based on processing other data, such as, for example, comparing an expiration date of authentication credentials with a current date.

Figure 3:
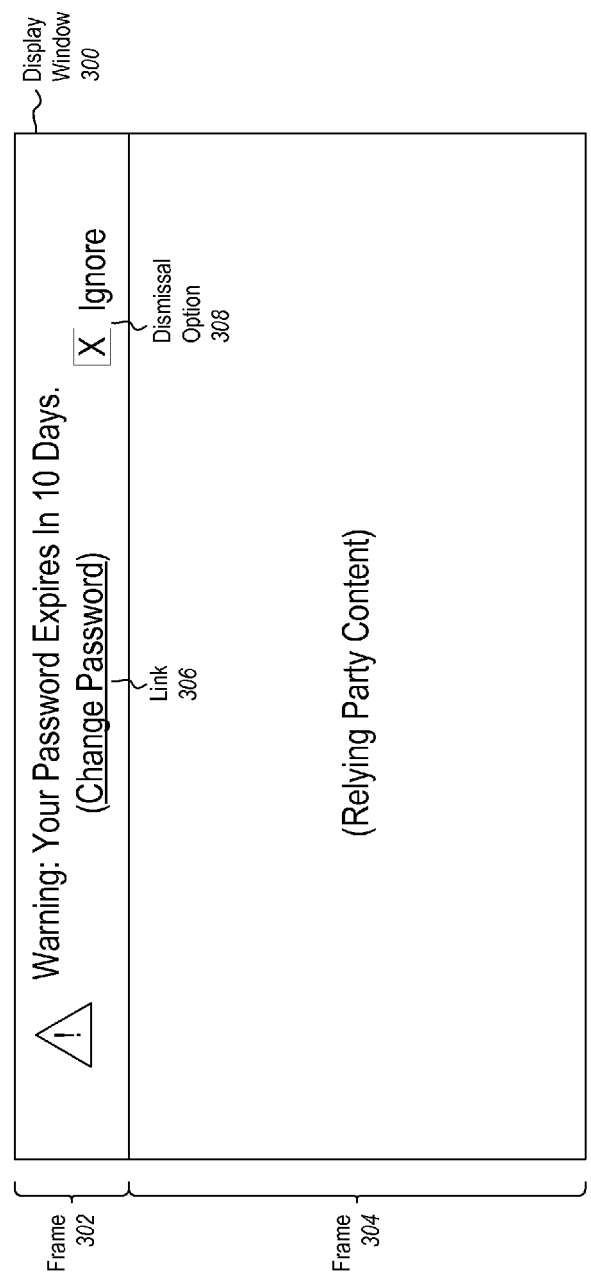
FIG. 3 illustrates an exemplary display window of a web browser that has rendered a frameset.

Method 200 includes an act of building a frameset, the frameset configured to cause the client computer system rendering the frameset to divide a display window at the client computer system into a plurality of content frames (act 208). For example, frameset generator 106*a* can generate a frameset, which is configured to divide a display window at client 116*a* (e.g., a display window generated by the browser 118*a*) into a plurality of portions. FIG. 3 illustrates an exemplary display window 300 of a web browser as divided by one possible frameset. For example, the display window 300 is divided by the frameset into frame 302 and frame 304.

Act 208 includes an act of building a first content frame, the first content frame configured to be filled with notification content presenting the notification to the user when the first content frame is rendered at the client computer system (act 210). For example, frameset generator 106*a* can generate content frame 302. Within frame 302, frameset generator 106*a* can include markup or code configured to cause browser 118*a* to render the notification. For example, frame 302 as depicted displays a password expiration notification, along with an option for taking action on the notification (e.g., link 306) or ignoring the notification (e.g., dismissal option 308).

Act 208 also includes an act of building a second content frame, the second content frame configured to be filled with web page content from a web page of the relying party when the second content frame is rendered at the client computer system, the web page content configured to also present the notification and to implement frame removal functionality, the frame removal functionality causing the client computer system to remove the frameset and to fill the entire display window with the web page content (act 212). For example, frameset generator 106*a* can generate content frame 304. Within frame 304, frameset generator 106*a* can include markup or code configured to cause browser 118*a* to load a web page of relying party 110*b*. For example, using relying party forwarding information 104*b*, frameset generator 106*a* can include "ReturnTo URL" markup which directs browser 118*a* to a URL of web service 112*b*. Relying party 110*b*, in turn, can include a version of the notification in the web page, along with frame bursting code which would remove the frameset generated by frameset generator 106*a*.

Method 200 includes an act of sending the frameset to the client computer system (act 214). For example, identity platform 102 can send client 116*a* a frameset defining frames 302 and 304 in response 132 so that client 116*a* can render the frameset using browser 118*a*.

Method 200 includes an act of receiving the frameset generated by the identity platform, the frameset defining the first content frame configured to be filled with notification content presenting the notification to the user when rendered, and the second content frame configured to be filled with web page content corresponding to the URL of the relying party when rendered (act 216). For example, client 116a can receive response 132, containing the frameset defining frames 302 and 304, in response to sending access request 131.

Method 200 includes an act of rendering the frameset (act 218). For example, client 116a can use browser 118a to render frames 302 and 304 received in response 132 from identity platform 102.

Based on rendering the frameset, act 218 includes an act of dividing the display window into at least the first content frame and the second content frame (act 220). For example, based on rendering the frameset, browser 118a can divide the rendered display window into a plurality of frames, such as frames corresponding to frames 302 and 304.

Also based on rendering the frameset, act 218 includes an act of requesting the web page from the relying party based on the URL (act 222). For example, based on rendering frame 304 generated by identity platform 102, browser 118a can receive instructions to request a web page from relying party 110b based on the URL to web service 112b. Using the URL, browser 118a can cause client 116a to send request 133 to relying party 110b for obtaining the web page from web service 112b.

Method 200 includes an act of receiving the request from the client computer system for web page content of the relying party, the request associated with the user at the client computer system gaining access to the relying party through the identity platform (act 224). For example, relying party 110b can receive request 133 for obtaining the web page associated with web service 112b.

Method 200 includes an act of determining that the notification exists for the user (act 226). For example, based on data (e.g., notification data 104c) made available by identity platform 102 to relying party 110b, or based on information independently tracked at relying party 110b, relying party 110b can also determine that the notification is available to user 117a. Alternatively, relying party 110b may leverage code made available by identity platform 102 to determine whether a notification is available. For example, relying party 110b may query identity platform 102 as to whether the notification is available, or may execute code provided by identity platform 102 to determine whether the notification is available.

Method 200 includes an act of configuring the web page to send to the client computer system, including configuring the web page with: frame removal functionality, the frame removal functionality configured to cause the client computer system to remove any frameset established by the identity platform which divides the display window at the client computer system into content portions, and to instead fill the entire display window with content of the web page when the web page is rendered at the client computer system; and notification content, the notification content configured to present the notification to the user within the context of the web page when the web page is rendered at the client computer system (act 228). For example, relying party 110b can configure a web page for client 116a. When configuring the web page, relying party 110b can include frame bursting code (e.g., JAVASCRIPT code) which, when executed, removes any frameset such as the frameset (e.g., frames 302 and 304) established by identity platform 102. Relying party 110b can provide this code itself, or it can obtain (or cause the browser 118a to obtain) the code from identity platform 102. For example, relying party 110b can obtain (or cause the browser 118a to obtain) frame bursting code 106b. In addition, relying party 110b can configure the web page to display the notification when rendered. Relying party 110b can generate this code itself, or relying party 110b can leverage code provided by identity platform 102. When configuring the web page to display the notification, relying party 110b can customize the content and/or display format of the notification and can also provide functionality for taking action on or dismissing the notification. As such, "notification content" can include the notification itself, as well additional content such as formatting information and/or additional functionality.

Method 200 includes an act of sending the web page to the client computer system (act 230). For example, once relying party 110b has prepared the web page, relying party 110b can send response 134 to client 116a. Response 134 can include the prepared web page.

Act 218 includes an act of retrieving the web page from the relying party based on the URL, the web page including the frame removal functionality which is configured to remove the frameset and to fill the entire display window with web page content from the web page, including web page content which presents the notification to the user (act 232). For example, client 116a can receive response 134, which includes the web page prepared by relying party 110b.

Act 218 also includes an act of rendering the web page, including removing the frameset by removing the first content frame and the second content frame, and filling the entire display window with the web page content from the web page, including the web page content which presents the notification to the user (act 234). For example, browser 118a can render the web page received from relying party 110a in response 134. During rendering, browser 118a can execute the frame bursting code, which removes the frameset (e.g., frames 302 and 304) established by identity platform 102, and render the web page content, including the notification provided by relying party 110b. Depending on how relying party 110b configured the web page, the frame bursting code and/or the notification content may, in some embodiments, be provided by identity platform 102. Also, depending on the order in which browser 118a renders the frameset, browser 118a may actually render the notification from identity platform 102 (e.g., browser 118a may render frame 302 prior to rendering frame 304). However, the frame busting may remove the notification so quickly that user 117a does not see the notification.

Figure 4A:
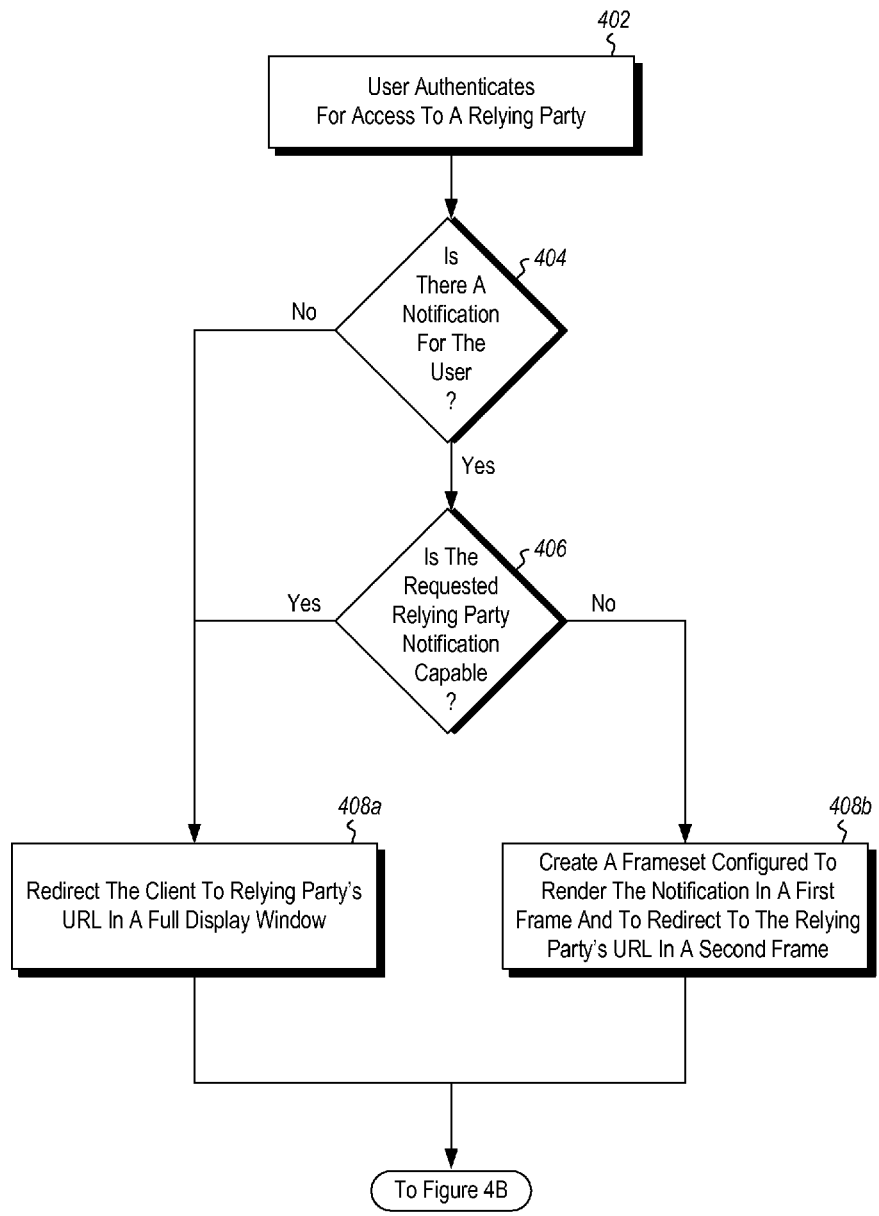
FIG. 4A illustrates an exemplary flow diagram for authenticating a user within an identity platform.
Figure 4B:
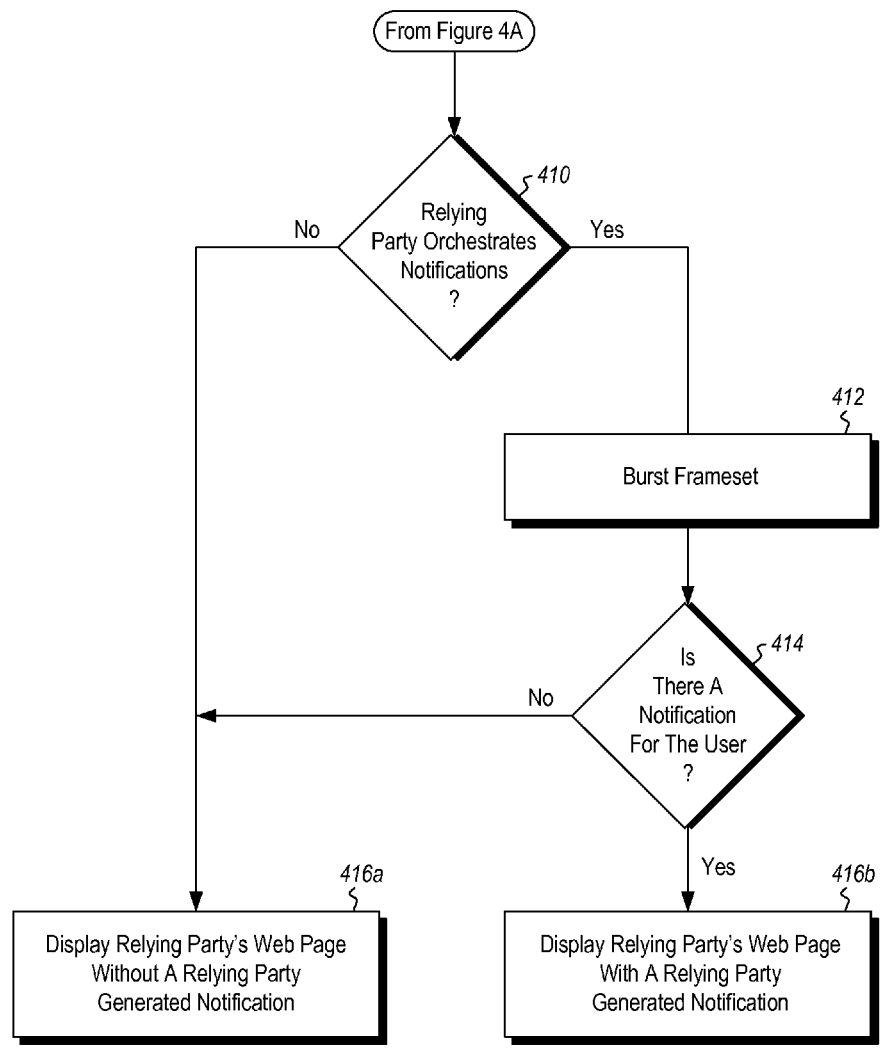
FIG. 4B illustrates an exemplary flow diagram for authenticating a user within an identity platform.

In addition, FIGS. 4A and 4B illustrate an exemplary flow diagram for authenticating a user within an identity platform. FIGS. 4A and 4B are described using the components and data of computer architecture 100. As depicted at step 402 of FIG. 4A, a user authenticates for access to a relying party. For example, user 117a at client 116a may request that identity platform 102 authenticate user 117a for access to relying party 110b. The request may include authentication data, such as user credentials (e.g., username and password), a digital token or certificate, biometric data, etc. Using authentication module 105, identity platform 102 can verify the provided authentication data and authenticate user 117a.

FIG. 4A also shows that at decision block 404 the identity platform determines whether a notification exists for the user. For example, after authenticating user 117a, authentication module 105 and/or orchestration module 106 can determine whether a notification exists for user 117a based on notification data 104c. As depicted, for example, notification data 104c indicates that there exists a notification for user 117a. When no notification exists for the user ("No" in decision block 404), FIG. 4A illustrates that at step 408a the identity platform redirects the client to the relying party's URL in a full display window. For example, identity platform 102 can use relying party forwarding information 104b to redirect browser 118a at client 116a to web service 112b of relying party 110b.

Alternatively (as in the depicted case) when a notification does exist for the user ("Yes" in decision block 404), FIG. 4A illustrates that at decision block 406 the identity platform determines whether the requested relying party is notification capable. For example, notification orchestration module 106 can use notification capable relying parties 104d to determine if the requested relying party is known to be notification capable. When the requested relying party is known to be notification capable ("Yes" in decision block 406), as would be the case if user 117a requested access to relying party 110a, then the identity platform redirects the client to the requested relying party's URL in a full display window, as shown in step 408a, similar to when no notification exists for the user.

When the requested relying party is not known to be notification capable ("No" in decision block 406), then at step 408b the identity platform creates a frameset which is configured to render the notification in a first frame and to redirect to the relying party's URL in a second frame. For example, when user 117a requests access to relying party 110b or relying party 110c, then notification orchestration module 106 uses frameset generator 106a to generate a frameset which, when rendered at browser 118a, is configured to load the requested relying party's web service in one frame, and which is configured to display the notification in another frame.

As depicted in FIG. 3, display window 300 may be divided by the frameset into frame 302 and frame 304. Frameset generator 106a can configure frame 302 with code or markup which, when rendered/executed, displays a password expiration warning for user 117a. As depicted, frameset generator 106a may also configure frame 302 to provide link 306 for changing the expiring password and dismissal option 308 for dismissing the notification. When dismissal option 308 is selected, frame bursting code (e.g., frame bursting code 106b from identity platform 102) can be executed by browser 118a, removing (or bursting) the frameset and displaying web service 112b from relying party 110b using the full display window. Dismissal option 308 can also cause identity platform 102 to refrain from displaying the notification for a defined period (e.g. the rest of the day). Frameset generator 106a may also configure frame 304 with code or markup which, when rendered/executed, causes the browser 118a to load web service 112b from relying party 110b. For example, frameset generator 106a may configure frame 304 with "ReturnTo URL" markup, which redirects browser 118a to web service 112b of relying party 110b based on a URL in forwarding information 104b (i.e., WS 112b).

Continuing at FIG. 4B, browser 118a receives either a URL to web service 112b for display in a full display window (from step 408a), or a frameset dividing the display window (from step 408b). In either case, browser 118a loads web service 112b of relying party 110b, either within or without a frameset.

When the relying party is not notification capable ("No" in decision block 410), then at step 416a the client loads the relying party's web service without a relying party-generated notification (and without frame bursting code). If there is a notification for user 117a, then user 117a sees the notification in frame 302, which was generated by identity platform 102 at step 408b. In addition, user 117a sees the relying party's web service in frame 304 with no relying party-generated notification. Conversely, when there is no notification for user 117a, then user 117a sees the requested relying party's web service the full browser window, with no relying party-generated notification.

On the other hand, since relying party 110b is notification capable ("Yes" in decision block 410), then browser 118a loads web service 112b from relying party 110b and executes frame bursting code at step 412, which relying party 110b included as part of web service 112b. As such, if identity platform 102 had created a frameset at step 408b, then web service 112b suppresses that frameset, along with the accompanying notification from identity platform 102. Then, at step 414, when there exists a notification for the user 117a ("Yes" at decision block 414) user 117a sees web service 112b the full browser window, along with a relying party-generated notification that is included in web service 112b. Otherwise, when there is no notification for user 117a ("No" at decision block 414) then user 117a sees the web service 112b in the full browser window with no relying party-generated notification. In some embodiments, even when a notification exists for the user 114a, relying party 112a may choose to omit presenting the notification with web service 112b, such as if the user 117a had already dismissed the notification previously that day, or if the relying party 112a chooses a different timetable for presenting notifications than the identity platform 102.

In either case, user 117a sees a notification, when available, from either the relying party 110b or identity platform 102, without seeing duplicate notifications. When one of relying parties 110 becomes notification capable, that party can notify identity platform 102 of this fact so that identity platform 102 can avoid needlessly generating the frameset. For example, relying party 110b, which has notification module 114b, can notify identity platform 102 that it is notification capable, and identity platform 102 can add relying party 110b to notification capable relying parties 104d. Notification capable relying parties can generate notifications on their own, enabling them to customize the notifications to their own needs, or can include code or markup from identity platform 102 that causes the notification to be rendered.

Accordingly, the present invention extends to methods, systems, and computer program products for orchestrating notifications between identity platforms and relying parties. Embodiments enable an identity platform to ensure that users consistently receive notifications, even when the identity platform lacks knowledge of which relying parties are notification capable and which relying parties are not notification capable. The identity platform generates a frameset having a first content frame for displaying a notification and a second content frame for displaying a relying party's web page. When the relying party is notification capable, the relying party's web page includes frame removal functionality which removes the frameset established by the identity platform and displays the notification within the context of the web page. When a client renders the frameset received from the identity platform, the client retrieves and renders the relying party's web page, removing the frameset and displaying the notification as supplied by the relying party.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer-implemented method for managing potentially conflicting client notifications in a network of computer systems, the network including at least one computing system that serves as an identity platform for one or more computing systems in the network that serve as relying parties which use the identity platform for authentication of users prior to providing access to web services to one or more users connected to the network at client computer systems, the computer-implemented method comprising acts of:

receiving at the identity platform a request from a user at a client computer system for web page content of a relying party;

authenticating at the identity platform the user who submitted the request;

determining at the identity platform that a notification exists for the user;

building at the identity platform a frameset to be used at a browser of the client computer system to divide a display window into a first content frame used for display of the notification, and a second content frame used for display of web page content provided by the relying party;

identifying at the identity platform relying party forwarding information;

the identify platform providing to the user's client computer system the frameset, the notification for display in the first content frame, and the relying party forwarding information;

the client computer system using the relying party forwarding information to access the relying party and the relying party sending to the client computer system the web page content;

prior to sending the web page content, if the relying party is capable of providing the notification without the aid of the identity platform, configuring the web page at the relying party using a configuration that includes:

frame removal functionality configured to cause the client computer system to remove the frameset established by the identity platform so that the first content frame and the notification for display therein as provided by the identity platform will be removed, and the web page will fill the entire display window with content of the web page when the web page is rendered at the client computer system; and notification content configured to present the notification to the user within the context of the web page when the web page is rendered at the client computer system;

if the relying party is not capable of providing the notification without the aid of the identity platform, prior to sending the web page, rendering at the client computer system the frameset provided by the identity platform, and:

filling the second content frame provided by the frameset with the content of the web page; and displaying the notification in the first content frame provided by the frameset.

2. The method as recited in claim 1, wherein if the relying party is capable of providing the notification without the aid of the identity platform, the relying party determines that a notification exists for the user by consulting local notification-related data.

3. The method as recited in claim 1, wherein if the relying party is capable of providing the notification without the aid of the identity platform, the relying party queries the identity platform to ascertain the notification.

4. The method as recited in claim 1, wherein the notification comprises code or markup provided by the identity platform that includes the notification.

5. The method as recited in claim 4, wherein if the relying party is capable of providing the notification without the aid of the identity platform, the relying party customizes the code or markup provided by the identity platform for display with the web page content of the relying party.

6. The method as recited in claim 1, wherein the notification comprises code or markup that presents one or more options for acting on the notification and one or more options for dismissing the notification.

7. The method as recited in claim 1, if the relying party is capable of providing the notification without the aid of the identity platform, the method further comprises the relying party retrieving from the identity platform frame removal code for implementing the frame removal functionality.

8. The method as recited in claim 1, further comprising:

an act of notifying the identity platform that the relying party is notification capable.

9. The method as recited in claim 1, wherein the notification comprises a notification related to one or more of: a password expiration warning, an account intrusion warning, a request for updated contact information, a service outage notification, or a new feature notification.

10. A computer-implemented method for managing potentially conflicting client notifications that are rendered when displaying a web page at a user's client computer, the computer-implemented method comprising acts of:

sending from a user at the client computer a request to an identity platform's computer system to access web page content at a relying party's computer system;

after authentication of the user at the identity platform, and after determining at the identity platform that one or more notifications are to be sent to the user, receiving at the client computer a frameset generated by the identity platform, the frameset dividing a display window at a browser of the client computer into a first content frame used for display of the one or more notifications, and a second content frame used for display of web page content provided by the relying party;

receiving at the client computer relying party forwarding information sent by the identity platform;

the client computer system using the relying party forwarding information to access the relying party's computer system and the relying party sending to the client computer system the web page content;

if the relying party is capable of providing the one or more notifications without the aid of the identity platform, receiving at the client computer system a configured web page from the relying party using a configuration that includes:

frame removal functionality configured to cause the client computer system to remove the frameset established by the identity platform so that the first content frame and the notification for display therein as provided by the identity platform will be removed, and the web page will fill the entire display window with content of the web page when the web page is rendered at the client computer system; and notification content configured to present the notification to the user within the context of the web page when the web page is rendered at the client computer system;

if the relying party is not capable of providing the notification without the aid of the identity platform, rendering at the client computer system the frameset provided by the identity platform, and:
  filling the second content frame provided by the frameset with the content of the web page; and
  displaying the one or more notifications in the first content frame provided by the frameset.

11. The method as recited in claim 10, if the relying party is capable of providing the one or more notifications without the aid of the identity platform, the relying party provides the frame removal functionality by:
  retrieving frame bursting code from the identity platform; and executing the frame bursting code.

12. The method as recited in claim 10, wherein if the relying party is capable of providing the one or more notifications without the aid of the identity platform, receiving at the client computer system a configured web page from the relying party comprises:
  retrieving frame bursting code from the relying party as part of the web page; and
  executing the frame bursting code.

13. The method as recited in claim 10, wherein if the relying party is not capable of providing the notification without the aid of the identity platform, rendering at the client computer system the frameset provided by the identity platform includes providing a notification dismissal option for at least one notification.

14. The method as recited in claim 13, wherein the first content frame that displays the at least one notification to the user also presents one or more options for acting on the at least one notification and one or more options for dismissing the at least one the notification.

15. A computer program product comprising one or more physical memory devices having stored thereon executable instructions for a computer-implemented method for managing potentially conflicting client notifications in a network of computer systems, the network including at least one computing system that serves as an identity platform for one or more computing systems in the network that serve as relying parties which use the identity platform for authentication of users prior to providing access to web services to one or more users connected to the network at client computer systems, the computer-implemented method comprising acts of:
  receiving at the identity platform a request from a user at a client computer system for web page content of a relying party;
  authenticating at the identity platform the user who submitted the request;
  determining at the identity platform that a notification exists for the user;
  building at the identity platform a frameset to be used at a browser of the client computer system to divide a display window into a first content frame used for display of the notification, and a second content frame used for display of web page content provided by the relying party;
  identifying at the identity platform relying party forwarding information;
  the identify platform providing to the user's client computer system the frameset, the notification for display in the first content frame, and the relying party forwarding information;
  the client computer system using the relying party forwarding information to access the relying party and the relying party sending to the client computer system the web page content;
  prior to sending the web page content, if the relying party is capable of providing the notification without the aid of the identity platform, configuring the web page at the relying party using a configuration that includes:
    frame removal functionality configured to cause the client computer system to remove the frameset established by the identity platform so that the first content frame and the notification for display therein as provided by the identity platform will be removed, and the web page will fill the entire display window with content of the web page when the web page is rendered at the client computer system; and
    notification content configured to present the notification to the user within the context of the web page when the web page is rendered at the client computer system;
  if the relying party is not capable of providing the notification without the aid of the identity platform, prior to sending the web page, rendering at the client computer system the frameset provided by the identity platform, and:
    filling the second content frame provided by the frameset with the content of the web page; and
    displaying the notification in the first content frame provided by the frameset.

16. The computer program product of claim 15, wherein if the relying party is capable of providing the notification without the aid of the identity platform, the relying party determines that a notification exists for the user by consulting local notification-related data.

17. The computer program product of claim 15, wherein if the relying party is capable of providing the notification without the aid of the identity platform, the relying party queries the identity platform to ascertain the notification.

18. The computer program product of claim 15, wherein the notification comprises code or markup that presents one or more options for acting on the notification and one or more options for dismissing the notification.

19. The computer program product of claim 15, wherein if the relying party is capable of providing the notification without the aid of the identity platform, the method further comprises the relying party retrieving from the identity platform frame removal code for implementing the frame removal functionality.

20. The computer program product of claim 15, wherein the computer-implemented method further comprises the relying party notifying the identity platform that the relying party is notification capable.

* * * * *